Dec. 21, 1965    C. A. MILLS    3,224,220
COMBINED RADIANT AND CONVECTION COOLING SYSTEM
Filed April 26, 1963
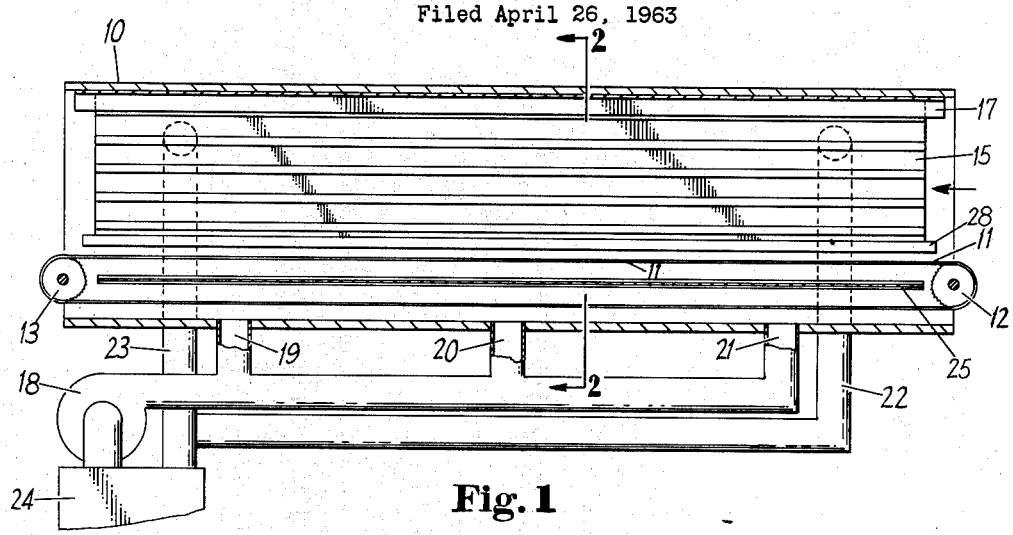
Fig. 1
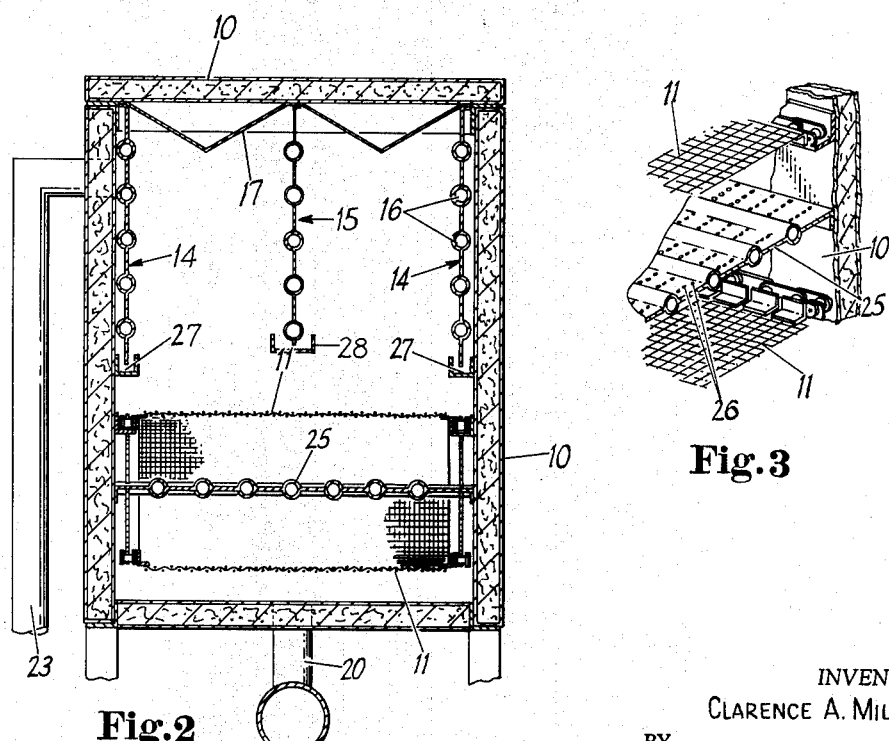
Fig. 2
Fig. 3
INVENTOR.
CLARENCE A. MILLS,
BY
ATTORNEYS

United States Patent Office 3,224,220
Patented Dec. 21, 1965

1

3,224,220
COMBINED RADIANT AND CONVECTION COOLING SYSTEM
Clarence A. Mills, 2311 Fairview Ave., Cincinnati, Ohio
Filed Apr. 26, 1963, Ser. No. 275,877
5 Claims. (Cl. 62—380)

This invention relates to combined radiant and convective cooling systems, and particularly to systems for use in association with a continuous cooling tunnel for organic material such as bakery goods, meat, and the like.

It is well known that oven hot food products, and particularly bakery goods such as bread, pies, cakes, and rolls, can lose their oven heat through three channels. These are evaporation of the products' contained moisture, conviction and radiation. In United States Patent No. 2,783,618, entitled Radiant Cooling Tunnels, radiant cooling is shown to have many advantages over the other methods of cooling. The primary advantage, of course, is the greatly reduced cooling time required by virtue of the fact that the radiant cooling can take place throughout the interior of the product as well as on the surface by radiant heat emission.

According to conventional practice, cooling tunnels in the food industry consist of continuous conveyors moving through an open-ended tunnel which includes fans or blowers for directing cool air against the products carried by the conveyor. During the first few minutes after leaving the oven, the cooling air will rapidly cool the surface of the product by convection. But since the inner layers of the product provide a considerable amount of insulation against passage of the interior heat out to the surface by conduction, further convective cooling is slow. More rapid movement of the cooling air results in a greatly increased rate of moisture loss or evaporative cooling.

It is generally well known in the food cooling art, that the escaping water vapor during evaporative cooling carries out with it much of the aromatic flavoring substances—the so-called "oven freshness" of the product.

Accordingly, it is a primary object of this invention to provide a cooling system which will sharply reduce the evaporative moisture loss during cooling of oven hot products, thereby attaining a higher degree of "oven freshness" in the finished product.

Another object of this invention is the provision of a cooling system which will reduce the total time required for cooling oven hot products to packaging temperatures.

The system of this invention, with slight modification, may also be adapted to the freezing of food products. That is, a properly designed cooling tunnel could receive oven hot products, cool them in certain sections, and freeze them in later sections of one virtually continuous operation. This will, of course, permit retention of various flavor qualities in a frozen food product to a much higher degree than has heretofore been possible as well as shorten the required cooling time.

It is therefore still another object of this invention to provide a cooling system which is adaptable to the quick freezing of food products.

Other objects and advantages of this invention will become apparent as this specification, taken in conjunction with the drawing proceeds. In the drawings:

FIGURE 1 is a cross sectional view through a cooling tunnel according to this invention;

FIGURE 2 is a cross sectional view taken along the line 2—2 of FIGURE 1; and

FIGURE 3 is a perspective view with fronts broken away showing some of the elements of the cooling tunnel of this invention.

Basically, the successful practice of this invention contemplates a combined radiant and convective cooling system. The following theory of the invention is set forth to aid in its understanding, but it is to be understood that there is no intention of being bound by the theory. It is now recognized that all heat originates in radiant form at wave lengths inversely related to the temperature of the emitting source, and that the transparency of organic material such as bakery products to radiant heat increases directly in relation to the wave lengths of the infra-red radiations emitted; hence it follows that the escape of radiant heat from a cooling organic mass can take place directly from progressively deeper layers beneath the surface as the mass cools. Herein lies the main advantage of radiant cooling for organic materials, especially in the lower temperature ranges of the cooling process.

It has now been discovered, however that the required cooling time for oven hot products can be further shortened, without a troublesome increase in evaporative moisture loss by combining certain features of both radiant and convective heat transfer channels. It is believed that utilization of the convective cooling reinforces and speeds up the radiant cooling. That is, utilizing convection to cool the surface of the product will permit the surface temperature of the product to drop, thereby emitting longer wave-length radiation from successively deeper layers of the product. By providing infrared radiation absorbers, the total required cooling time can be sharply reduced.

By way of example, Table I compares the following types of cooling for various products:

I. Cooling in a conventional tunnel with air alone.

II. Radiant cooling alone (plate coils at 33° F. to 36° F. and the substantially still tunnel air at 39° F. to 42° F.).

III. Radiant cooling under the conditions set forth in II, but with moderate air movement (tunnel velocity of 30 to 70 feet per minute).

IV. Radiant cooling under the conditions set forth in II, but with violent air movement (in excess of 300 feet per minute) within the tunnel.

It will be noted that in every case, radiant cooling in still air cut the required time sharply from that in the conventional cooling tunnel, and also lowered the evaporative moisture loss. The addition of moderate air currents within the tunnel to facilitate convection cooling still further shortened the required cooling time, and did not materially increase evaporative moisture losses. On the other hand, violent movement of air within the cooling tunnel (see the second example, IV) only slightly reduced the total cooling time, but sharply stepped up evaporative moisture loss.

TABLE I

| Product To Be Cooled | Type of Cooling | Oven-Hot Wt. (gms.) | Evap. Loss (gms.) | Total Temp. Drop (° F.) | Total Heat Loss (B.t.u./cake) | Evap. Heat Loss | | Cooling Time (min.) |
|---|---|---|---|---|---|---|---|---|
| | | | | | | Per Cake | Percent of Total | |
| Donuts | I | 70 | 1.8 | 120 | 9.3 | 4.0 | 43 | 22 |
| | II | 74 | 0.9 | 120 | 9.7 | 2.0 | 21 | 12.1 |
| | III | 74 | 0.9 | 120 | 9.8 | 2.0 | 20 | 9 |
| Bar Cake (7" x 9" x 1") | I | 211 | 7.0 | 110 | 25.6 | 15.7 | 61 | 32 |
| | II | 214 | 4.0 | 110 | 25.9 | 9.0 | 35 | 20 |
| | III | 232 | 4.0 | 110 | 28.1 | 9.0 | 32 | 13.5 |
| | IV | 231 | 7.0 | 110 | 28.0 | 15.7 | 56 | 13 |
| White Bar Cake (7" x 9" x 1") | I | 201 | 7.0 | 110 | 24.3 | 15.7 | 65 | 30 |
| | II | 200 | 3.0 | 110 | 24.2 | 6.7 | 28 | 20 |
| | III | 206 | 3.0 | 110 | 25.0 | 6.7 | 27 | 16 |
| Cinnamon Coffee Cake (10" x 4.5" x 1.5") | I* | 448 | 4.9 | 80 | 45.8 | 11.4 | 25 | 60 |
| | II* | | | 80 | | | | 33.5 |
| | III* | 456 | 1.7 | 80 | 46.6 | 4.0 | 9 | 22 |
| Pecan Coffee Cake (12" x 12" x 1.5") | I* | 352 | 5.7 | 90 | 40.5 | 13.3 | 33 | 60 |
| | III* | 354 | 2.6 | 90 | 40.7 | 6.1 | 15 | 20 |

*Products cooled while in aluminum pans.

An exemplary embodiment of the invention has been shown in the accompanying drawings. In FIG. 1, there has been shown an open-ended enclosure 10. The tunnel walls, top, and bottom, may of course be formed of any suitable material, and may be constructed in such sizes as desired.

Within the tunnel enclosure is mounted the continuous conveyor 11, mounted about a driving drum 12 and a driven drum 13. The conveyor mechanism may of course be varied to accommodate different products. However, it is essential that the conveyor 11 be formed of an open mesh material allowing free vertical passage of the moving air within the tunnel. In the embodiment shown, the conveyor 11 is made of open mesh metal.

The area above the conveyor 11 includes vertically disposed infrared heat absorbing surfaces 14 and 15. These absorbing surfaces 14 and 15 are preferably of the tube-in-strip type illustrated with carbon blacked surfaces. That is, each includes a plurality of longitudinal passages 16, through which is passed an appropriate cooling medium.

Positioned between the absorbing surfaces 14 and 15 is the V-shaped reflector 17. Metallic surfaces such as aluminum are normally reflective to infrared or long wave length radiation. Therefore, heat waves radiating from a product carried by the conveyor would normally be reflected from the roof of the cooling tunnel back onto the product itself, and this would greatly extend the required cooling time. Hence, the reflector 17 is provided, which serves to direct the infrared heat rays from the product carried by the conveyor laterally toward the absorbing cold surfaces 15 and 16. As set forth more fully elsewhere in the art (see for example U.S. Patent 2,966,780 entitled Radiant Cooling Systems) carbon blacked plate coils maintained at a low temperature are particularly effective in absorbing ultra-long wave length infrared heat radiation. It will of course be understood that a suitable supply of refrigerant will be supplied to the tubes 16 of the cooling plates 14 and 15.

Convection cooling of products in the tunnel is provided by the blower 18, communicating with the tunnel through the openings 19, 20 and 21. Suitable warm air return ducts 22 and 23 will of course be provided. The air within the tunnel may be cooled solely by contact with the chilled plate coil surfaces, but it is preferable to provide an independent and conventional means for cooling the air supply. Such means may be housed in a separate chamber 24, and if desired, could include additional elements for controlling the humidity of the cooling air.

It is also preferable for most usages to provide an additional infrared absorbing plate coil 25 which is mounted beneath the portion of the conveyor belt carrying the products being cooled. As is clearly shown in FIG. 3, the plate coil 25 must be provided with a plurality of openings 26, so that the cooling air admitted at the bottom of the tunnel structure may rise through the plate coil and past the products carried by the conveyor belt 11.

The horizontally disposed plate coil 25 may be omitted if the products are to be cooled while still maintained in an aluminum bake pan or the like. It is well known that the radiation emission of aluminum bake pans is very low and hence the infrared absorbing surface beneath the conveyor belt 11 is not needed.

The invention as discussed thus far has been dealing only with the cooling of hot products as opposed to the freezing of these products. In such case, it is very likely that condensation will form on the cooling coils 14 and 15, and for this reason it will be seen that they are vertically oriented, and provided with drip troughs 27 and 28. In the tunnel sections where it is desired to use this invention in the deep freezing of organic materials, the infrared absorbing surfaces above the conveyor may be horizontally disposed. This will, of course, eliminate the need for the reflector 17, and for the drip troughs 27 and 28, since the air circulating through the freezing sections of the tunnel will be far below freezing temperatures and of low humidity.

While the invention has been described in terms of an exemplary embodiment, no limitations are intended thereby. Numerous modifications may be made in this invention without departing from its scope and spirit. For example, the principles of the invention are applicable to a batch cooler, wherein the products being cooled are placed on a stationary platform rather than the conveyor shown.

What is claimed as new, and what it is desired to secure by Letters Patent is:

1. A cooling system comprising means defining a tunnel, a perforate platform disposed within said tunnel defining means, at least one carbon blacked plate coil for absorbing ultra-long wave length radiation in the space above said platform, and means for directing a moderate movement of cooling air through said tunnel defining means.

2. The system claimed in claim 1 including reflector means disposed to direct said infrared radiation toward said absorbing means.

3. The cooling system claimed in claim 2 wherein said absorbing means comprises a plurality of vertically disposed carbon blacked cooling coils mounted above said platform.

4. The cooling system claimed in claim 3 including a horizontally disposed carbon blacked cooling coil mounted beneath said platform.

5. The cooling system claimed in claim 4 wherein said horizontally disposed cooling coil comprises a tube-in-strip panel, said panel being perforate and wherein said cooling air is directed through said platform from below said horizontally disposed cooling coil.

References Cited by the Examiner

UNITED STATES PATENTS

| | | | |
|---|---|---|---|
| 2,223,972 | 12/1940 | Sterling | 62—63 X |
| 2,237,256 | 4/1941 | Finnegan | 62—63 |
| 2,425,714 | 8/1947 | Baer. | |
| 2,783,618 | 3/1957 | Mills | 62—380 |
| 2,981,081 | 4/1961 | Larsen | 62—380 |

FOREIGN PATENTS 882,148   11/1961   Great Britain.

OTHER REFERENCES

German printed application No. 1,125,958, printed Mar. 22, 1962.

EDWARD J. MICHAEL, *Primary Examiner.*